(12) United States Patent
Narayanan et al.

(10) Patent No.: US 9,683,682 B2
(45) Date of Patent: Jun. 20, 2017

(54) METHODS AND SYSTEMS OF JOINING PIPES

(71) Applicant: Lincoln Global, Inc., City of Industry, CA (US)

(72) Inventors: Badri Narayanan, Mayfield Heights, OH (US); John Procario, Cleveland, OH (US)

(73) Assignee: Lincoln Global, Inc., City of Industry, CA (US)

( * ) Notice: Subject to any disclaimer, the term of this patent is extended or adjusted under 35 U.S.C. 154(b) by 934 days.

(21) Appl. No.: 13/833,552

(22) Filed: Mar. 15, 2013

(65) Prior Publication Data

US 2014/0035279 A1    Feb. 6, 2014

Related U.S. Application Data

(60) Provisional application No. 61/679,512, filed on Aug. 3, 2012.

(51) Int. Cl.

| | |
|---|---|
| *B23K 26/24* | (2014.01) |
| *F16L 13/02* | (2006.01) |
| *B23K 26/348* | (2014.01) |
| *B23K 1/005* | (2006.01) |
| *B23K 26/323* | (2014.01) |
| *B23K 26/282* | (2014.01) |
| *B23K 101/06* | (2006.01) |

(Continued)

(52) U.S. Cl.
CPC ........ *F16L 13/0245* (2013.01); *B23K 1/0056* (2013.01); *B23K 26/24* (2013.01); *B23K 26/282* (2015.10); *B23K 26/323* (2015.10); *B23K 26/348* (2015.10); *B23K 2201/06* (2013.01); *B23K 2203/18* (2013.01); *B23K 2203/20* (2013.01)

(58) Field of Classification Search
CPC .... B23K 1/0056; B23K 26/24; B23K 26/282; B23K 26/323; B23K 2201/06; B23K 2203/18; B23K 26/348; B23K 26/1423; B23K 26/1429; B23K 2201/10
See application file for complete search history.

(56) References Cited

U.S. PATENT DOCUMENTS 1,878,829 A * 9/1932 Crouch .................. F16L 13/00
                                                    285/22
3,032,870 A * 5/1962 Rohrberg ................ F16L 13/08
                                                    228/154

(Continued)

FOREIGN PATENT DOCUMENTS

JP      7-009173 A  *  1/1995
JP   2001-198689 A  *  7/2001

(Continued)

OTHER PUBLICATIONS

Machine translation of Japan Patent document No. 2003-333,721, Jun. 2016.*

(Continued)

*Primary Examiner* — Geoffrey S Evans
(74) *Attorney, Agent, or Firm* — Perkins Coie, LLP.

(57) ABSTRACT

A system and method is provided for joining pipes where a keyhole is formed in each of the pipe ends and then a filler metal is placed in the keyholes to join the pipes to each other. The filler metal can be deposited using a laser hot wire process.

23 Claims, 7 Drawing Sheets

(51) Int. Cl.
*B23K 103/18* (2006.01)
*B23K 103/20* (2006.01)

(56) References Cited

U.S. PATENT DOCUMENTS

| | | | | |
|---|---|---|---|---|
| 4,663,513 A | * | 5/1987 | Webber | B23K 26/034 |
| | | | | 219/121.6 |
| 6,336,583 B1 | | 1/2002 | Wang et al. | |
| 2003/0125118 A1 | * | 7/2003 | Raghavan | B23K 26/123 |
| | | | | 464/182 |
| 2003/0136768 A1 | * | 7/2003 | Sonoda | B23K 26/1429 |
| | | | | 219/121.64 |
| 2007/0210042 A1 | * | 9/2007 | Forrest | B23K 26/0604 |
| | | | | 219/121.64 |
| 2008/0245774 A1 | * | 10/2008 | Kim | B23K 26/0093 |
| | | | | 219/121.64 |
| 2008/0296271 A1 | * | 12/2008 | Klein | B23K 26/123 |
| | | | | 219/121.64 |
| 2010/0059493 A1 | * | 3/2010 | McAninch | B23K 9/1093 |
| | | | | 219/137 PS |
| 2010/0176109 A1 | * | 7/2010 | Peters | B23K 9/04 |
| | | | | 219/137.61 |
| 2010/0206856 A1 | * | 8/2010 | Tanaka | B23K 26/244 |
| | | | | 219/121.64 |
| 2011/0100965 A1 | * | 5/2011 | Yano | B23K 26/03 |
| | | | | 219/121.64 |
| 2011/0284666 A1 | | 11/2011 | Sugiyama et al. | |
| 2011/0297658 A1 | * | 12/2011 | Peters | B23K 9/02 |
| | | | | 219/162 |
| 2012/0152916 A1 | * | 6/2012 | Oowaki | B23K 31/12 |
| | | | | 219/121.64 |
| 2013/0309000 A1 | * | 11/2013 | Lin | B23K 26/1429 |
| | | | | 219/121.64 |

FOREIGN PATENT DOCUMENTS

| | | | |
|---|---|---|---|
| JP | 2003-333721 A | | 11/2003 |
| JP | 2004-209515 A | | 7/2004 |
| JP | 2006-26724 A | | 2/2006 |
| JP | 2011-020175 A | * | 2/2011 |
| JP | 2011-031257 A | * | 2/2011 |
| JP | 2011-062278 A | * | 3/2011 |
| JP | 2012-030263 A | * | 2/2012 |

OTHER PUBLICATIONS

Machine translation of Japan Patent document No. 2012-030,263, Jun. 2016.*
Human translation of Japan Patent document No. 2003-333,721, Oct. 2016.*
Gebhardt, Moritz Oliver et al., Hybrid Process Welds Thick-Walled Tubes, Welding Journal, pp. 55-61, Jun. 2012.
International Application No. PCT/IB2013/001704, International Search Report & Written Opinion, 9 pages, Feb. 6, 2014.

* cited by examiner

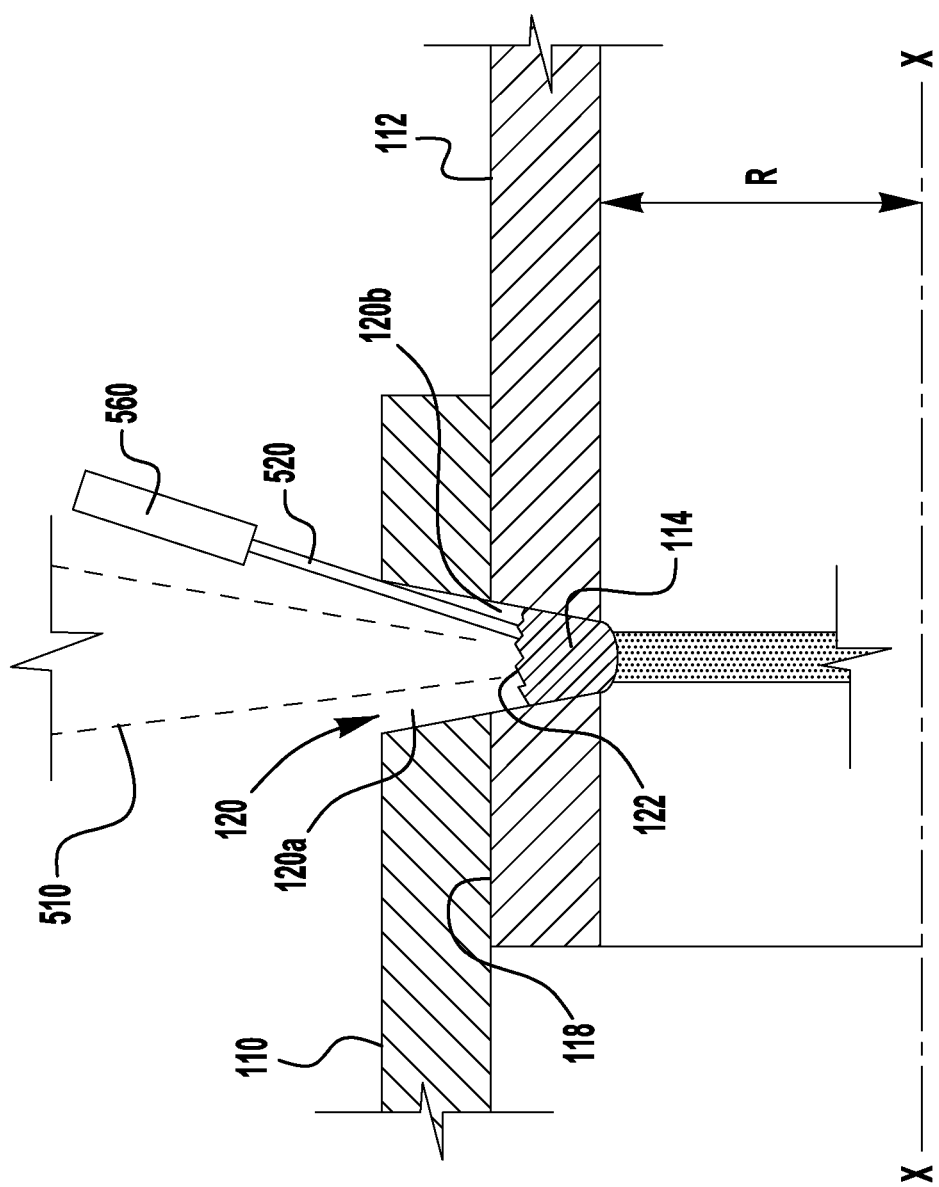

US 9,683,682 B2

METHODS AND SYSTEMS OF JOINING PIPES

PRIORITY

The present application claims priority to U.S. Provisional Patent Application No. 61/679,512 filed Aug. 3, 2012, which is incorporated herein by reference in its entirety.

TECHNICAL FIELD

This invention relates to systems and methods of joining pipes. More specifically, the subject invention relates to systems and methods for joining pipes with a hot wire system and process.

BACKGROUND

Shown in FIG. 1A is an illustrative embodiment of a typical weld joint 10 between a first pipe 12 and second pipe 14. The second pipe 14 is inserted within the first pipe 12 and a consumable electrode or wire is applied to form a fillet weld 16 to join the first and second pipes 12, 14. The fillet weld 16 may be formed by any know welding or joining technique, including known arc welding techniques. The joining process and weld metal formation introduces heat into the joint 10 and more particularly the pipes 12, 14 to generate a heat affected zone (HAZ) 18 in each of the pipes 10, 12 proximate the weld metal. As described in U.S. Pat. No. 6,336,583, the HAZ is the portion of the base metal in each of the pipes 10, 12 that has not been melted, but in which the microstructure and mechanical properties have been altered by the heat introduced by the joining process. To rectify any undesirable alterations, the pipe and joints may be subjected to a heat treatment process.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Embodiments of the present invention provide for systems and methods for joining two pipes and in one particular aspect reduces the heat input into the pipe joint so as to minimize the effects of the HAZ on the base metal which may eliminate the need for heat treatment. In one particular embodiment a pipe joint includes a first pipe and a second pipe disposed in the first pipe to define a pipe joint axis extending therebetween. The first and second pipes at least partially coaxially overlap to define an interface between. A weld metal extends radially toward the pipe joint axis and circumferentially about the joint axis. In one particular embodiment, a sleeve is coaxially disposed between the first and second pipes to form the interface therebetween.

These and other features of the claimed invention, as well as details of illustrated embodiments thereof, will be more fully understood from the following description and drawings.

BRIEF DESCRIPTION OF THE DRAWINGS

The above and/or other aspects of the invention will be more apparent by describing in detail exemplary embodiments of the invention with reference to the accompanying drawings, in which:

FIG. 3A is a detailed view of the pipe joint formation with the system of FIG. 3;

DETAILED DESCRIPTION

Figure 1A:
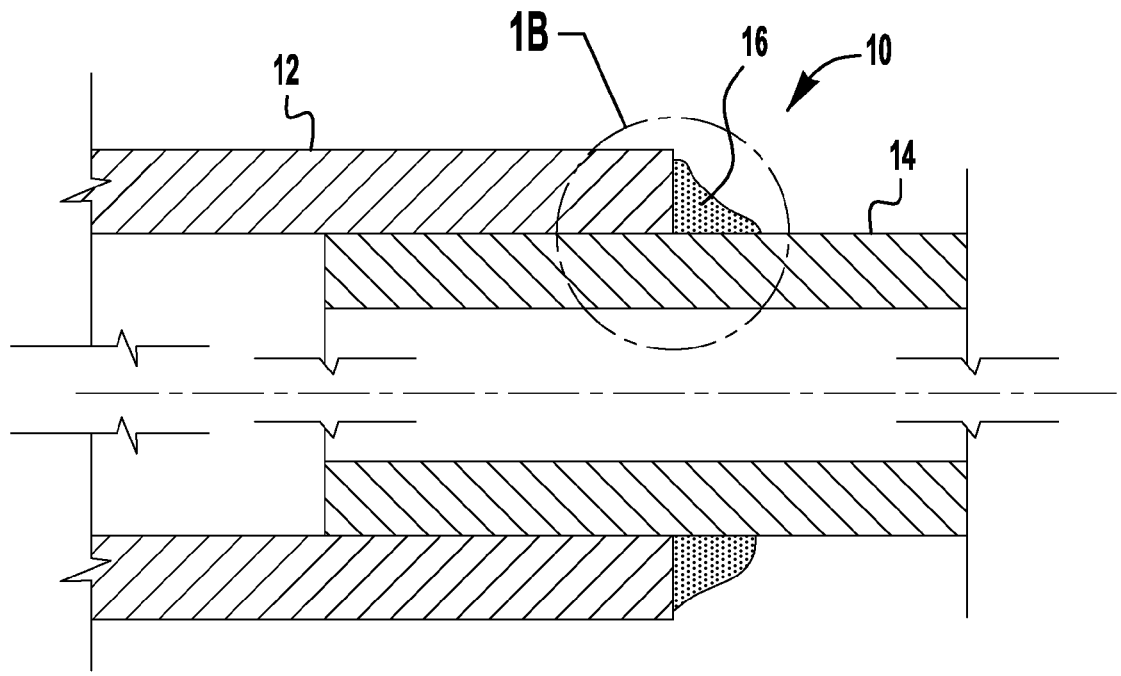
FIGS. 1A-1B show a known pipe joint formed by a known pipe joint process.
Figure 1B:
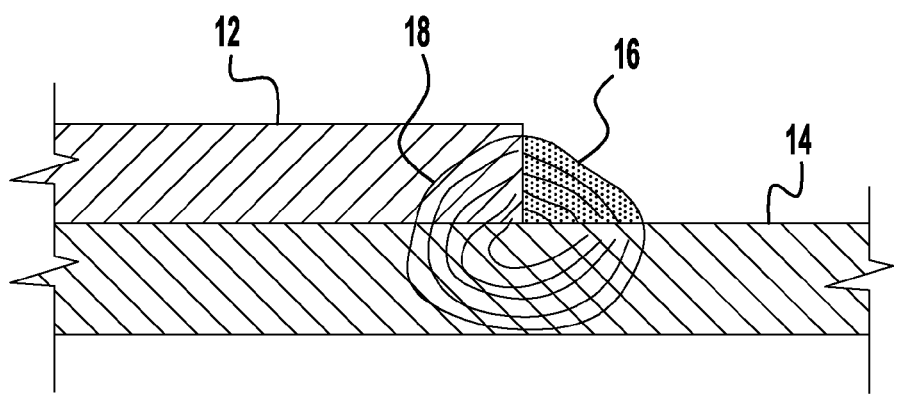

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Figure 2:
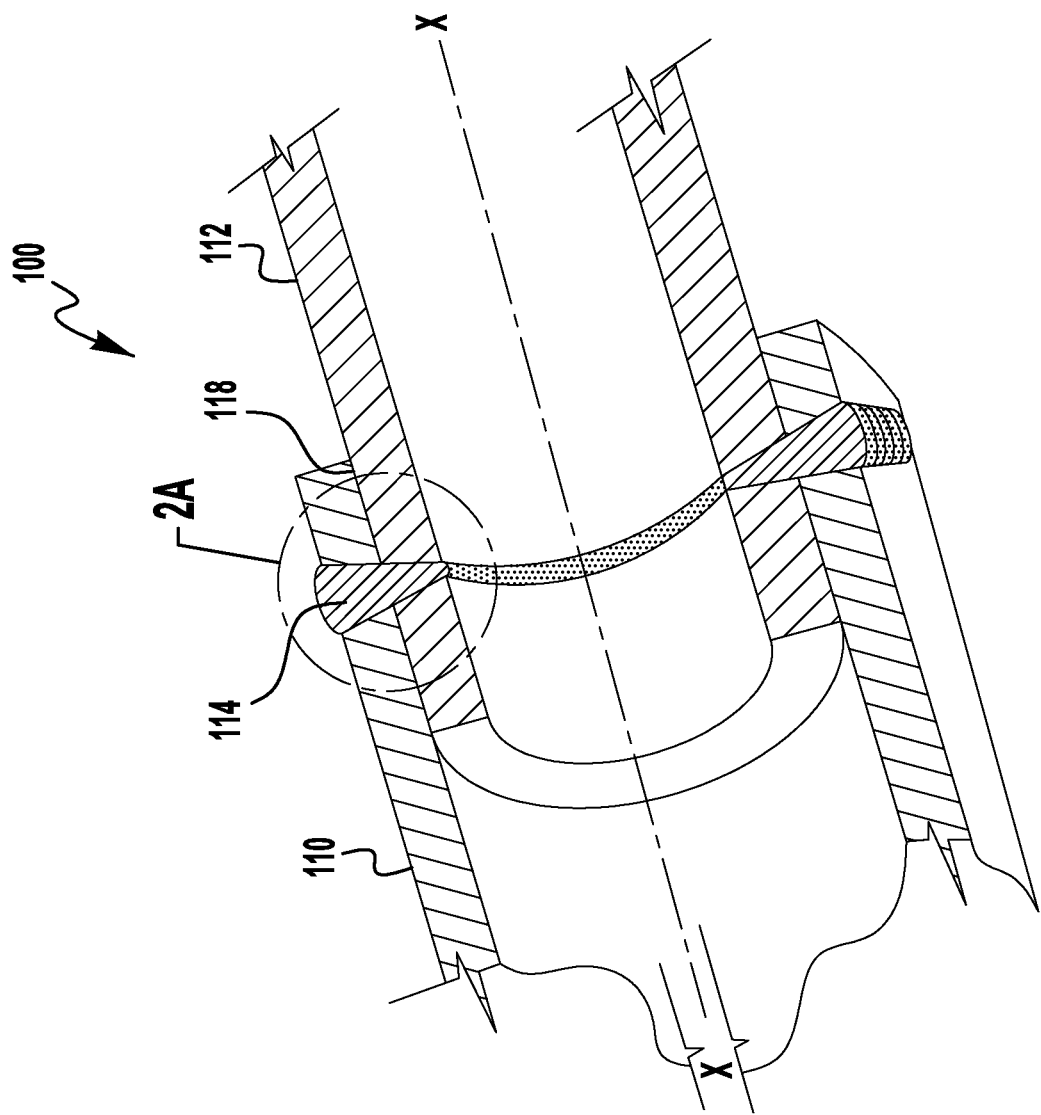
FIG. 2 shows a perspective view of one exemplary embodiment of a pipe joint.
Figure 2A:
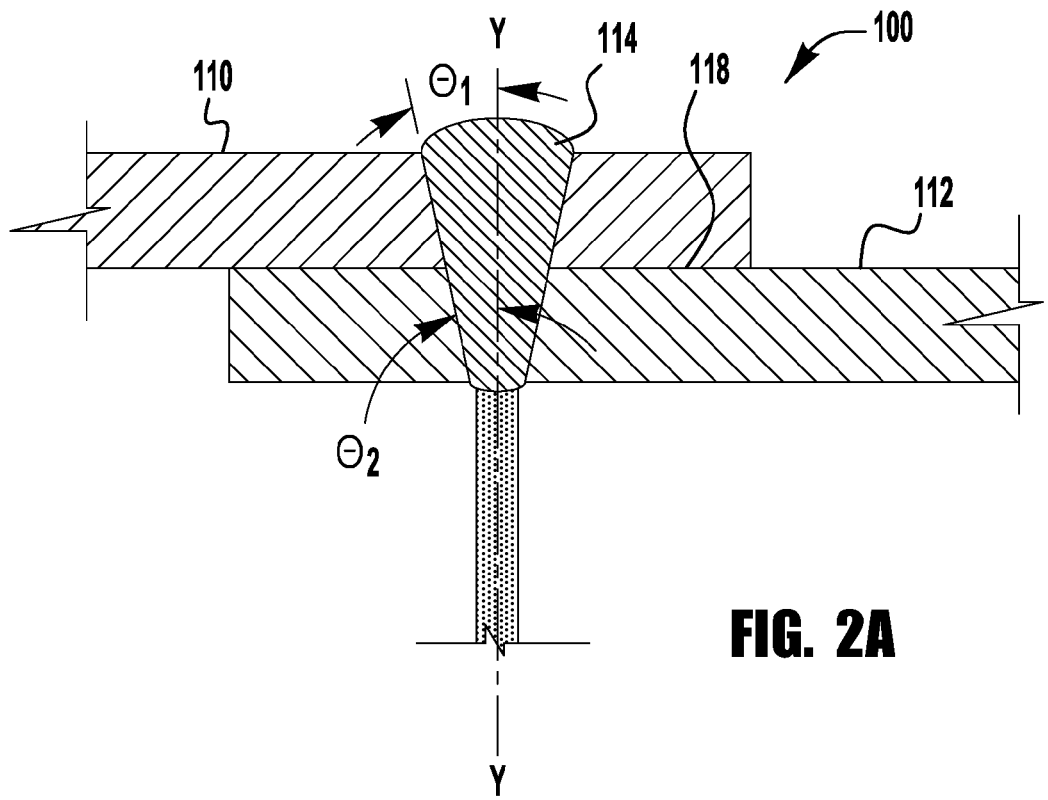
FIG. 2A shows a detailed view of the pipe joint of FIG. 2.
Figure 2B:
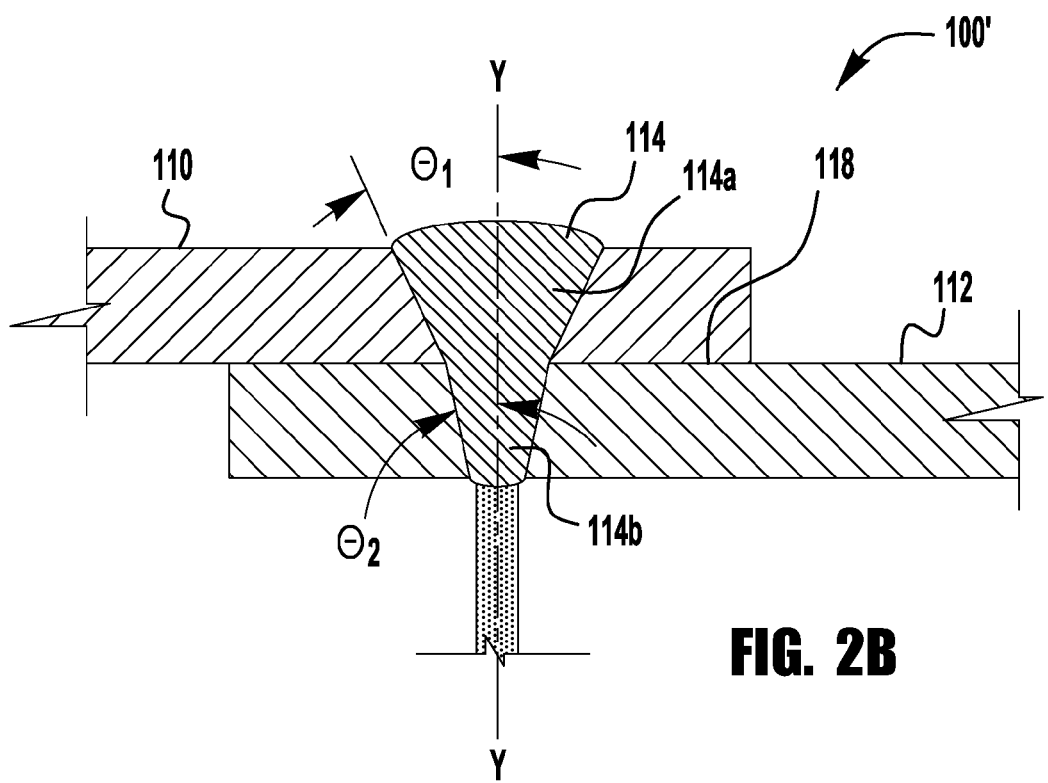
FIG. 2B shows an alternate embodiment of a pipe joint.

An exemplary embodiment of the invention, shown in FIGS. 2, 2A and 2B provides a pipe joint 100 formed by a first pipe 110 joined to a second pipe 112 defining a central axis X-X. Disposed within the first pipe 110 is one end of a second pipe 112 in which the ends of the first and second pipes are coaxially aligned along axis X-X. As used herein "pipe" includes linear pipe, formed pipe such as, for example, bent pipe; or pipe fittings, such as for example, T-fittings, elbow fittings. Mechanically joining the first 110 and second pipe 112 is a weld metal 114 which is formed by an exemplary hot wire process. The weld metal 114 extends radially toward the central axis X-X through each of the first and second pipes 110, 112 and circumferentially about the axis X-X. The weld metal 114 is formed by an exemplary embodiment of a hot wire process that in one aspect minimizes the heat input into the base metals of each of the first pipe 110 and second pipe 112 thereby minimizing or eliminating the impact of the HAZ generated about the weld metal 114.

Figure 3:
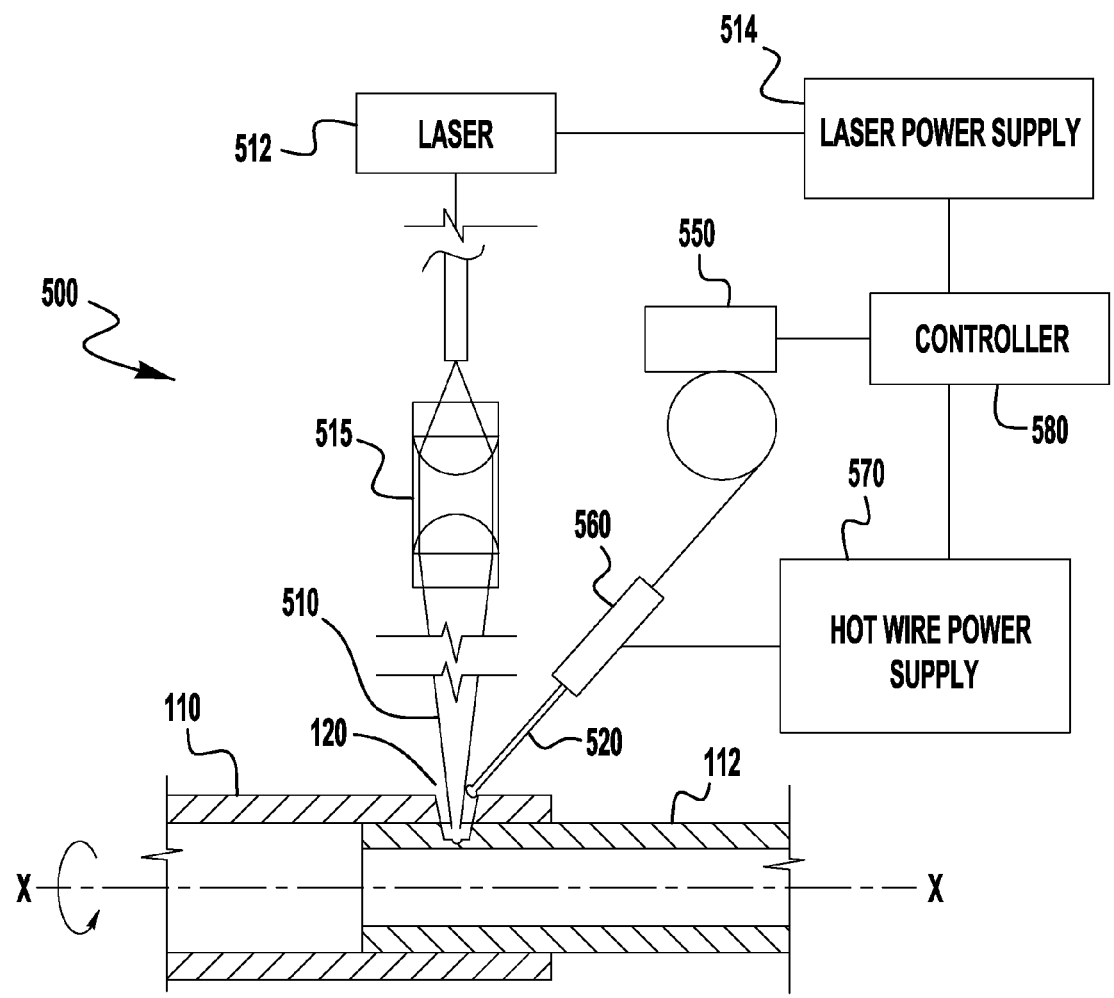
FIG. 3 is an illustrative schematic view of an exemplary hot wire process system forming the pipe joint of FIG. 2.

Shown in FIGS. 3 and 3A is a hot wire system 500 forming the pipe joint 100 between the first pipe 110 and the second pipe 112. In initially forming the pipe joint 100, the second pipe 112 is inserted into the first pipe 110 to form, for example, an interference fit or alternative slip fit. The system 500 for carrying out the exemplary hot wire process includes a consumable or filler wire 520 fed through a contact tube 560 which applies a heating signal voltage and/or current from a hot wire power supply 570 to heat the consumable wire 520 to its melting or near its melting point. A high intensity energy source 512, is directed to the pipe joint and the consumable wire or filler wire to generate and maintain a weld puddle within the pipe joint. The system shown is using a laser 512 as a heat source, but embodiments are not limited to the use of a laser as other high energy heat sources can be used, consistent with the descriptions herein. The consumable 520 is brought into proximity and spaced from the pipes 110, 112. Additional details of the system 500 are shown and described in U.S. Patent Publication No. 2011/

0297658 and U.S. Patent Publication No. 2010/0176109, each of which is fully incorporated by reference in their entireties. The consumable 520 can have varying configurations including being a solid filler wire, flux-coated or flux cored filler wire. Configurations of exemplary filler wires and welding processes are shown and described in The Lincoln Electric Company publications: (i) Publication No. 06.4000, entitled "Welding Guide: Stainless Steels" (February 2011); and (ii) Murex Product Catalog ADCM23C (March 2005).

In the embodiment shown, the laser beam 510 is generated from a laser source 512 and laser power supply 514 and delivered to the joint formation site of the pipes 110, 112. As shown in the particular embodiment of FIG. 3, the laser beam 510 can be delivered to the pipes via appropriate collimating/focusing optics 515 coupled to a fiber laser source or delivery subsystem 512. Formed and extending through the overlapping regions of the pipes 110, 112 defining a pipe joint interface 118 is a keyhole 120. The keyhole is defined by a first portion 120*a* extending through the first pipe 110 and a second portion 120*b* extending through the second pipe 112.

In one embodiment, the keyhole 120 is formed by the laser beam 510 melting the base material in each of the first and second pipes 110, 112. More specifically, the laser beam 510 delivers a first density of energy, measured for example, in power per area, e.g., (Watts/square in—W/sq. in.) to the first pipe 110 to melt the base material and form the aperture or opening in the first pipe 112 to define the first portion of the keyhole 120*a*. The laser beam 510 delivers a second density (W/sq. in.) of energy to the second pipe 112 to melt the base material and form the aperture or opening in the second pipe 112 to define the second portion of the keyhole 120*b*. The first and second densities of energy delivered by the laser beam 510, in one aspect may be function of the base materials to be melted. That is, if the materials are the same, the energy densities can be the same.

However, if the materials to be joined are different, or have a different geometry, the energy densities can be different to effect proper melting of the base material in the respective pipes. Accordingly, in one aspect of forming the keyhole 120 in the process of pipe joint formation, the energy densities delivered by the laser beam 510 may be equal or different depending upon the energy density required to melt the base materials. A first energy density is delivered to form the first portion of the keyhole in the first pipe 110. A second energy density (W/sq. in.) is delivered within the aperture and to the second pipe 112 to form the second portion of the keyhole 120.

A filler wire 520 material is extended within the aperture of the keyhole 120. The filler wire is coupled to a power source 570 and resistance heated to or near to its melting temperature by a DC, pulsed DC or AC waveform. The filler wire can be fed at either a constant or varied wire feed speed rate by feeder 550. In a first embodiment of the formation of pipe joint 100 and in the formation of the keyhole 120, the laser beam generates a molten puddle 122 within the keyhole 120. With the formation of the molten puddle 122, the filler wire 520 is fed by a wire feeder 550 and heated via a contact tube 560 coupled to a power supply, such as for example, the hot wire power supply 570. The heating can be via resistance heating. Referring again to FIG. 3A, as the distal end of the filler wire 520 is melted or nearly melted, the distal end of the filler wire 520 is placed in contact with the molten puddle 122 to transfer filer wire material to the molten puddle 122 within the keyhole 120. Because the melting distal end of the filler wire 520 is continuously in contact with the molten puddle 122, the location and current and/or voltage to the filler wire 520 is controlled so as to prevent formation of an arc between the wire 520 and the base metal of the pipes 110, 112. Accordingly one particular embodiment of pipe joint formation provides for forming the joint without an arc generated between the wire 520 and the pipes 110, 112.

In exemplary embodiments of the present invention, the energy density is varied, as schematically shown in FIGS. 3 and 3A, to alter the depth of the laser energy delivery and more particularly reduce the depth at which the laser maintains the molten puddle 122. Accordingly as the laser depth is reduced, the base material of the pipes 110, 112 and the filler material deposited in the keyhole 220 mix and solidify to form a weld metal 114. The pipes 110, 112 and filler wire/laser beam 520, 510 are rotated with respect to one another about the pipe joint axis X-X so as to form the continuous, and more particularly circular weld metal 114 as seen, for example, in FIG. 2. In the formation of the weld joint 114, the keyhole 120 may extend fully through the second and inner pipe 112 to the inner passage of the pipe joint or alternatively, stop short of fully penetrating the second pipe 112. As seen in FIG. 3, the system 500 includes a controller(s) 580 coupled to at least one of the laser power supply 514 and hot wire power supply 570 to respectively control formation of the keyhole 120 and/or heat of the wire 520. The controllers 580 can be operated so as to minimize the heat input into hot wire processes described herein so as to minimize the effects of the HAZ in each of the first and second pipes 110, 112.

The weld metal 114 facilitates a mechanical joint and seal between the weld metal 114 and the first and second pipes 110, 112. In cross-section, the weld metal 114, as seen in FIG. 2A, is a substantially frustro-conical formation extending in the radial direction to define a rivet axis Y-Y through the first and second pipes 110, 112. Accordingly in one aspect, the weld metal 114 tapers narrowly in the radial direction from the outer surface of the first pipe 110 towards the inner surface of the second pipe 112. In one particular embodiment, shown in FIG. 2B, the radially outer portion of the weld metal 114 forms an enlarged head 114*a* defining a first angle $\theta_1$ with respect to a vertical parallel to axis Y-Y and a second portion 114*b* to define a second angle $\theta_2$ with respect to a vertical parallel to axis Y-Y. Various shapes and for the weld metal 114 can be utilized to achieve the desired physical properties for the joint. However, other shapes for the weld metal 114 can be formed. For example, the weld metal 114 can be rectangular in cross-section such that there is no appreciable taper along its length. The cross-section of the weld metal created should be such that they create the desired mechanical strength and fluid for the specific application of the pipe joint 100.

In a second alternate embodiment, the hot wire process is substantially similar to that previously described except this second embodiment provides for an arc generated between the filler wire 120 and the pipes 110, 112. More specifically, the power supply 570 delivers a signal to the filler wire 520 sufficient to form an arc between the wire 520 and the pipes 110, 112. Accordingly, an arc formed at wire 520 can be used in combination with the laser beam 510 to form the keyhole 120 and/or within the keyhole control the depth and/or width or diameter of the keyhole 120. In one aspect and with reference to FIG. 3, the feeder 550 is coordinated with the power supply 570 to locate the distal end of the filler wire 520 at a distance from the molten puddle 122 within the keyhole 120 with a desired voltage or current carried in the filler wire to generate an arc within the keyhole 120. With the pipes 110, 112 and laser beam/filler wire 510, 520 rotated with respect to one another about the axis A-A, the keyhole 120 and weld metal 114 are circumferentially formed in a coordinated manner to form the pipe joint 100.

Figure 4:
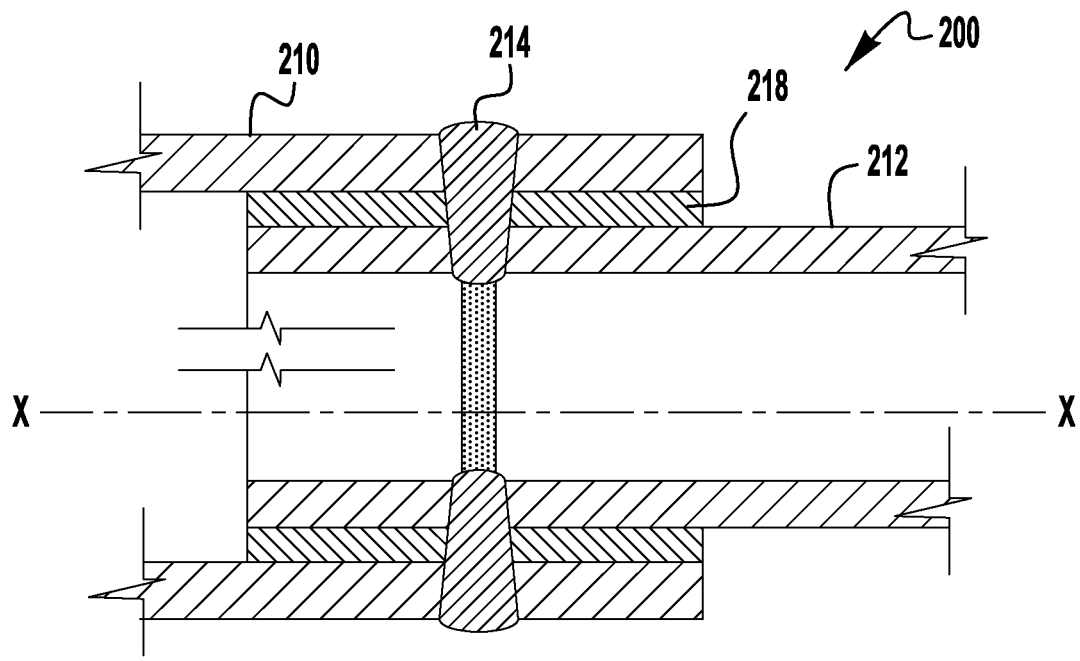
FIG. 4 shows another embodiment of a pipe joint using a second embodiment of a pipe joint process.

Another embodiment of pipe joint 200 is shown in FIG. 4 that includes a first pipe 210 joined to a second pipe 212 disposed in the first pipe 210 defining a central axis X-X in which the ends of the first and second pipes 210, 212 are coaxially aligned along axis X-X. Mechanically joining the first pipe 210 and second pipe 212 is a weld metal 214 which is formed by the exemplary hot wire processes and embodiments described above. The weld metal 214 extends radially toward the central axis X-X through each of the first and second pipes 210, 212 and circumferentially about the axis X-X. The exemplary embodiment of joint 200 further includes a sleeve 218 defining an overall interface between the first and second pipes 210, 212. The sleeve 218 facilitates the initial fit between the first and second pipes 210, 212 in forming the pipe joint 200. The sleeve 218 further facilitates the fluid seal between the first and second pipes 210, 212 upon formation of the joint 200. In some exemplary embodiments, the sleeve 218 can be of the same material as the pipes 210 and 212, while in other embodiments the sleeve 218 can be of a material which is different than that of at least one of the pipes 210/212. For example, in some embodiments the sleeve 218 can be of a material that allows the joining of dissimilar materials, where the pipes 210 and 212 are two different materials. For example, the sleeve 218 can be made from an alloy which allows steel and aluminum to be joined.

Figure 5:
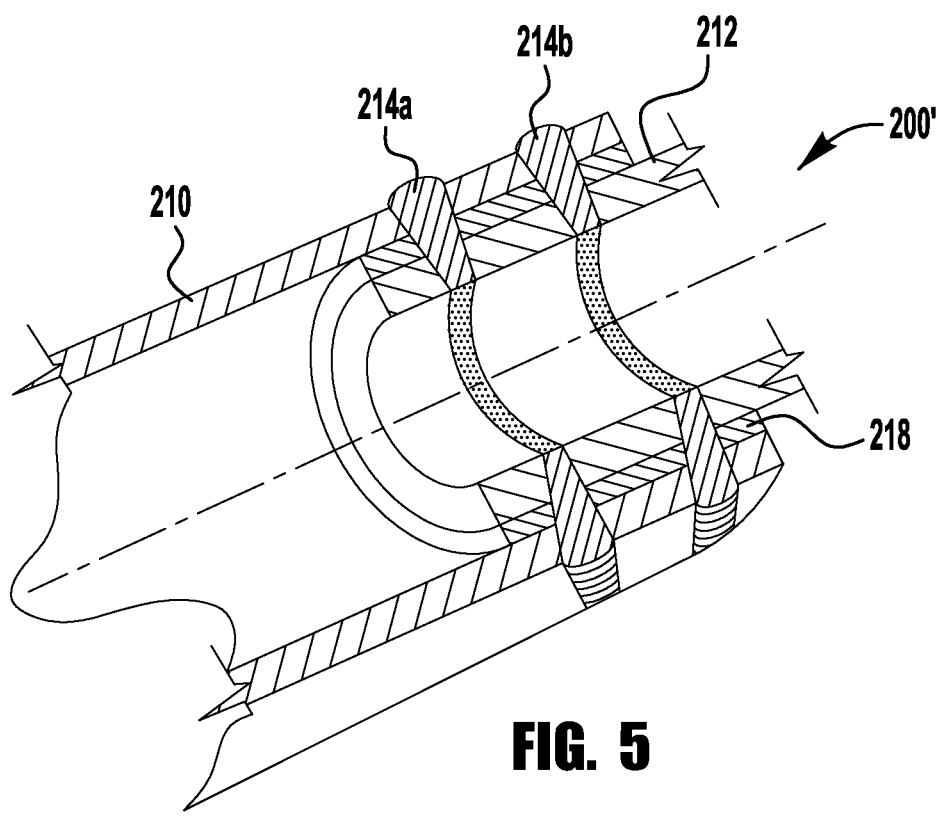
FIG. 5 shows a perspective view of another pipe joint using the joining process of FIG. 4.

Shown in FIG. 5 is another alternative embodiment of the pipe joint 200' formed with aspects of the hot wire processes and joints described above. The joint 200' includes multiple weld metal formations 214a and 214b which join first and second pipes 210, 212. Although only two weld formations are shown, more than two weld formations can be formed between the pipes. The pipe joint 200' includes a sleeve between the first and second pipes, but the weld joint 200' may be formed without a sleeve.

Figure 6:
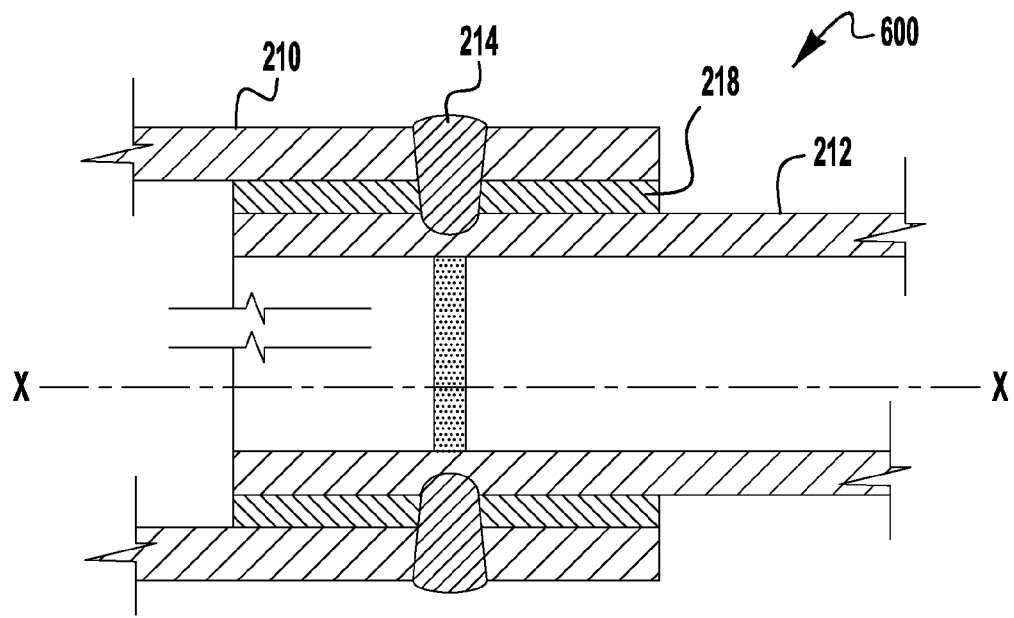
FIG. 6 shows a further exemplary embodiment of a pipe joint in accordance with a further exemplary embodiment of the present invention.

FIG. 6 depicts another exemplary embodiment of the present invention which is similar to that shown in FIG. 4. However, in this embodiment, the penetration of the weld metal 214 does not go through each of the pipe pieces 210/212. Instead, the weld metal 214 fully penetrates the first pipe 210 but only extends to a penetration depth PD which is less than the full thickness of the second pipe 212. Such embodiments can be used where it is not desirable to have the weld metal 214 exposed within the pipe 212. Of course, such an embodiment can be used with or without the sleeve 218. In some exemplary embodiments the penetration depth PD does not exceed 80% of the maximum thickness of the pipe 212. Further, in other exemplary embodiments, the weld metal 214 can be oriented opposite that shown in FIG. 6 such that the metal 214 does not penetrate the outer surface of the outer pipe 210. Further, The weld metal 214 can be created using any of the methods and systems described and/or incorporated herein.

Figure 7A:
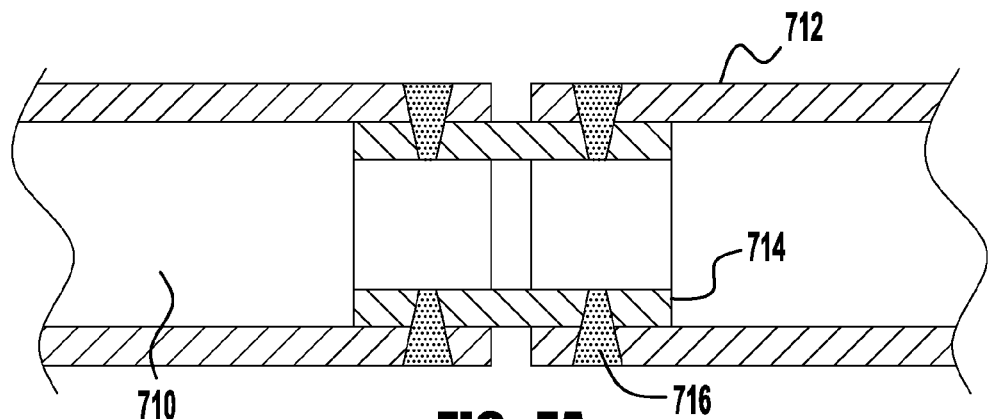
FIGS. 7A and 7B show additional exemplary embodiments of a pipe joint of the present invention.
Figure 7B:
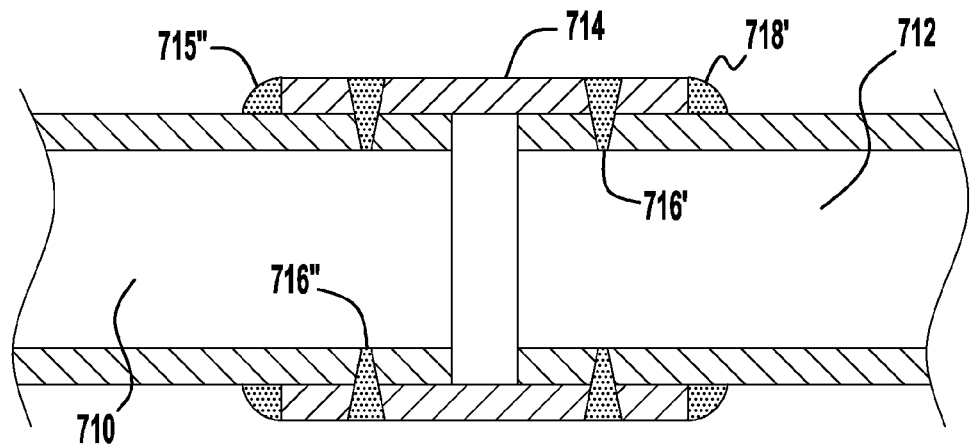

FIGS. 7A and 7B depict additional embodiments of pipe joints which are representative of exemplary embodiments of the present invention. The joints depict in FIGS. 1 through 6 are simple overlap joints and are intended to be representative of embodiments of the present invention, which encompasses many different types of pipe joints, some of which are depicted in FIGS. 7A and 7B. FIG. 7A depicts an embodiment where each of pipes 710 and 712 are secured to each other using a connector 714 and the weld metal 716 is created using systems and methods as described and incorporated herein. Further, fillet joints can be added at the ends of the connector 716 as desired. Furthermore, a sleeve (not depicted) can be utilized, as described above, in between the connector 714 and the pipes 710/712. Of course, the weld metal 716 can or cannot fully penetrate the pipes as desired. FIG. 7B is a further exemplary embodiment where an outer connector 714 is utilized and fillet welds 718' and 718" are utilized. Exemplary embodiments of the present invention can increase productivity by allowing the connector 714 to be connected to a pipe 712 via beads 716' and 718" prior to installation and thus only requiring the beads 716" and 718" be created at installation. Further, The fillet beads 718'/718" can be created by a welding process different from that of the beads 716'/716". Of course, the beads 716' and 716" need not fully penetrate both pipes 710/712 as shown in FIG. 7B, but can partially penetrate as described herein. Further, multiple beads similar to 716'/716" can also be utilized, similar to that shown in FIG. 5.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A method of forming a joint between a first pipe of a first base material and a second pipe of a second base material, the method comprising:
   disposing the second pipe coaxially within the first pipe to define a pipe joint axis;
   forming at least one keyhole extending at least partially through the first and second pipes with a beam from a first heat source;
   forming a weld metal in the at least one keyhole from a filler wire connected to a power supply;
   rotating the first and second pipes relative the filler wire and the first heat source; and
   forming an arc with the wire in the keyhole.

2. The method of claim 1, wherein forming the at least one keyhole includes delivering a laser beam to the first and second pipes.

3. The method of claim 2, wherein delivering the laser beam includes delivering the laser beam with a first energy density to the first pipe and delivering the laser beam to the second pipe with a second energy density, the second energy density being different from the first energy density.

4. The method of claim 2, wherein delivering the laser beam includes delivering the laser beam with a first energy density to the first pipe and delivering the laser beam to the second pipe with a second energy density, the second energy density being the same as the first energy density.

5. The method of claim 2, wherein delivering the laser beam includes delivering the laser beam with an enemy density being a function of the first and second materials.

6. The method of claim 2, wherein forming the weld metal includes controlling the depth in which a molten puddle is maintained within the keyhole, the depth being controlled by controlling the energy density of the laser beam to the keyhole.

7. The method of claim 1, wherein forming the weld metal include tapering the weld metal within the keyhole.

8. The method of claim 1, wherein forming the at least one keyhole forms the keyhole completely through the first and second pipe materials toward the joint axis.

9. The method of claim 1, further comprising disposing a sleeve between the first and the second pipe.

10. The method of claim 1, wherein forming the at least one keyhole includes axially spacing a plurality of keyholes spaced apart along the pipe joint axis.

11. A method of forming a joint between a first pipe of a first base material and a second pipe of a second base material, the method comprising:
   disposing the second pipe coaxially with respect to the first pipe to define a pipe joint axis;
   disposing a sleeve between the first and second pipe so as to interconnect the first and second pipes;
   forming at least one keyhole extending at least partially through a least one of the first pipe and the second pipe and through the sleeve with a beam from a first heat source;
   forming a weld metal in the at least one keyhole from a filler wire connected to a power supply;
   rotating the first pipe, second pipe and sleeve relative the filler wire and the first heat source; and
   forming an arc with the wire in the keyhole.

12. The method of claim 11, wherein disposing the second pipe includes disposing the second pipe within the first pipe, and disposing the sleeve including disposing the sleeve within the first pipe and outside the second pipe.

13. The method of claim 11, wherein disposing the second pipe includes disposing the second pipe so as not to overlap the first pipe, and disposing the sleeve within the first pipe and the second pipe.

14. The method of claim 11, wherein disposing the second pipe includes disposing the second pipe so as not to overlap the first pipe, and disposing the sleeve outside the first pipe and the second pipe.

15. The method of claim 11, further comprising disposing a weld bead between the sleeve and the first and second pipes.

16. The method of claim 11, wherein forming the at least one keyhole includes axially spacing a plurality of keyholes spaced apart along the pipe joint axis.

17. The method of claim 11, wherein forming the at least one keyhole includes delivering a laser beam to the first and second pipes.

18. The method of claim 17, wherein delivering the laser beam includes delivering the laser beam with a first energy density to the first pipe and delivering the laser beam to the second pipe with a second energy density, the second energy density being different from the first energy density.

19. The method of claim 11, wherein delivering the laser beam includes delivering the laser beam with a first energy density to the first pipe and delivering the laser beam to the second pipe with a second energy density the second energy density being the same as the first energy density.

20. The method of claim 11, wherein delivering the laser beam includes delivering the laser beam with an energy density being a function of the first and second materials.

21. The method of claim 11, wherein forming the weld metal includes controlling the depth in which a molten puddle is maintained within the keyhole, a depth being controlled by controlling the energy density of the laser beam to the keyhole.

22. The method of claim 11, wherein forming the weld metal include tapering the weld metal within the keyhole.

23. A method of forming a joint between a first pipe of a first base material and a second pipe of a second base material, the method comprising:
   disposing the second pipe coaxially with respect to the first pipe to define a pipe joint axis;
   disposing a sleeve between the first and second pipe so as to interconnect the first and second pipes;
   forming at least one keyhole extending at least partially through at least one of the first pipe and the second pipe and through the sleeve with a beam from a first heat source;
   forming a weld metal in the at least one keyhole from a filler wire heated by a second heat source; and
   rotating the first pipe, second pipe and sleeve relative to the filler wire and the first heat source,
   wherein forming the weld metal includes delivering the filler wire to the at least one keyhole so as to maintain the filler wire in continuous contact with a molten puddle in the keyhole.

* * * * *